US012631455B2

(12) United States Patent
Chauchat et al.

(10) Patent No.: US 12,631,455 B2
(45) Date of Patent: May 19, 2026

(54) NAVIGATION ASSISTANCE METHOD FOR A MOBILE CARRIER

(71) Applicants:SAFRAN, Paris (FR); ASSOCIATION POUR LA RECHERCHE ET LE DEVELOPPEMENT DES METHODES ET PROCESSUS INDUSTRIELS-A.R.M.I.N.E.S., Paris (FR)

(72) Inventors: Paul Chauchat, Moissy-Cramayel (FR); Axel Barrau, Moissy-Cramayel (FR); Silvère Bonnabel, Noumea (NC)

(73) Assignees: SAFRAN, Paris (FR); LA RECHERCHE ET LE DEVELOPPEMENT DES METHODES ET PROCESSUS INDUSTRIELS—A.R.M.I.N.E.S., Paris (FR)

( * ) Notice: Subject to any disclaimer, the term of this patent is extended or adjusted under 35 U.S.C. 154(b) by 275 days.

(21) Appl. No.: 17/796,937

(22) PCT Filed: Feb. 3, 2021

(86) PCT No.: PCT/FR2021/050199
§ 371 (c)(1),
(2) Date: Aug. 2, 2022

(87) PCT Pub. No.: WO2021/156569
PCT Pub. Date: Aug. 12, 2021

(65) Prior Publication Data
US 2023/0078005 A1     Mar. 16, 2023

(30) Foreign Application Priority Data
Feb. 3, 2020     (FR) .................................. FR2001069

(51) Int. Cl.
*G01C 21/00* (2006.01)
*G01C 21/16* (2006.01)

(52) U.S. Cl.
CPC .................................. *G01C 21/165* (2013.01)

(58) Field of Classification Search
CPC ....... G01C 21/165; G05D 1/00; B60W 30/00; G01S 5/00; G01S 7/00; G01S 13/00;
(Continued)

(56) References Cited

U.S. PATENT DOCUMENTS

| | | | | |
|---|---|---|---|---|
| 7,181,323 | B1 * | 2/2007 | Boka ...................... | G01S 7/4004 |
| | | | | 73/1.16 |
| 8,065,074 | B1 * | 11/2011 | Liccardo ............ | G01C 21/1654 |
| | | | | 73/504.03 |

(Continued)

FOREIGN PATENT DOCUMENTS

| | | | | | |
|---|---|---|---|---|---|
| CN | 116772903 | A | * | 9/2023 | ............. G06F 17/16 |
| CN | 121099198 | A | * | 12/2025 | |

OTHER PUBLICATIONS

Emter, Thomas, and Janko Petereit. "Simultaneous localization and mapping for exploration with stochastic cloning EKF." 2019 IEEE International Symposium on Safety, Security, and Rescue Robotics (SSRR). IEEE, 2019. (Year: 2019).*

(Continued)

*Primary Examiner* — Angelina M Shudy
(74) *Attorney, Agent, or Firm* — BIRCH, STEWART, KOLASCH & BIRCH, LLP

(57) ABSTRACT

A navigation assistance method for a mobile carrier including an inertial navigation unit, at least one inertial sensor, an estimation unit performing steps of: parametrization of a non-linear system configured to estimate a navigation state of the mobile carrier over a given time interval at an iteration n as a function of a kinematic model and/or measurements;

(Continued)

linearization of the system so that the system expresses a navigation state at iteration n as a function of the state at iteration n−1 and a correction to this navigation state; estimating a first correction of a navigation state at iteration n; estimating a second correction of the navigation state at iteration n; determining a third correction by merging the first and second corrections; and correcting the navigation state at iteration n as a function of the third correction, the corrected state being used at iteration n+1.

6 Claims, 5 Drawing Sheets

(58) Field of Classification Search
CPC .......... G01S 15/00; G01S 17/00; G01S 19/00; G08G 1/00; G08G 5/00
See application file for complete search history.

(56) References Cited

U.S. PATENT DOCUMENTS

| | | | | |
|---|---|---|---|---|
| 8,761,439 | B1 * | 6/2014 | Kumar | G06T 7/73 |
| | | | | 382/103 |
| 9,031,809 | B1 * | 5/2015 | Kumar | G01S 5/163 |
| | | | | 702/150 |
| 9,746,392 | B2 * | 8/2017 | Hinnant, Jr. | G01M 5/0016 |
| 9,909,877 | B2 * | 3/2018 | Ingvalson | G01C 25/005 |
| 10,268,882 | B2 * | 4/2019 | Lee | G06V 10/811 |
| 10,345,427 | B2 * | 7/2019 | Barrau | H04W 4/029 |
| 10,942,029 | B2 * | 3/2021 | Kwon | G01C 21/20 |
| 11,941,079 | B2 * | 3/2024 | Robert | G05D 1/46 |
| 12,189,044 | B2 * | 1/2025 | Davain | G01S 19/22 |
| 12,286,151 | B1 * | 4/2025 | Greiff | B62D 13/06 |
| 12,529,563 | B2 * | 1/2026 | Roumeliotis | G01C 21/1656 |
| 2005/0046388 | A1 * | 3/2005 | Tate | G01R 31/367 |
| | | | | 320/132 |
| 2008/0082266 | A1 * | 4/2008 | Bye | G01S 19/22 |
| | | | | 701/472 |
| 2009/0254275 | A1 * | 10/2009 | Xie | G01C 21/005 |
| | | | | 701/469 |
| 2010/0256906 | A1 * | 10/2010 | Monrocq | G01C 21/188 |
| | | | | 701/500 |
| 2011/0084878 | A1 * | 4/2011 | Riley | G01S 19/20 |
| | | | | 342/357.58 |
| 2012/0221244 | A1 * | 8/2012 | Georgy | G01S 19/47 |
| | | | | 701/472 |
| 2012/0265440 | A1 * | 10/2012 | Morgan | G01C 21/165 |
| | | | | 701/472 |
| 2014/0121963 | A1 * | 5/2014 | Buck | G01C 21/188 |
| | | | | 701/535 |
| 2014/0288828 | A1 * | 9/2014 | Werner | G01C 22/00 |
| | | | | 701/527 |

| | | | | |
|---|---|---|---|---|
| 2016/0005164 | A1 | 1/2016 | Roumeliotis et al. | |
| 2016/0165140 | A1 * | 6/2016 | Mourikis | H04N 23/683 |
| | | | | 348/208.2 |
| 2016/0290808 | A1 * | 10/2016 | Barrau | G01C 25/005 |
| 2017/0160399 | A1 * | 6/2017 | Barrau | G01S 19/37 |
| 2017/0314928 | A1 * | 11/2017 | Perrot | G01C 21/188 |
| 2018/0031387 | A1 * | 2/2018 | Scherer | G06T 7/579 |
| 2018/0032802 | A1 * | 2/2018 | Lee | G06V 10/806 |
| 2018/0095159 | A1 * | 4/2018 | Barrau | G06F 17/11 |
| 2020/0088521 | A1 * | 3/2020 | Glevarec | G01C 21/188 |
| 2020/0158862 | A1 * | 5/2020 | Mahmoud | G01S 13/931 |
| 2020/0232880 | A1 * | 7/2020 | Barrau | F16H 57/01 |
| 2020/0290577 | A1 * | 9/2020 | Berntorp | B60W 40/068 |
| 2020/0293067 | A1 * | 9/2020 | Lu | G05D 1/0816 |
| 2021/0293978 | A1 * | 9/2021 | Barrau | G01C 21/1652 |
| 2021/0295718 | A1 * | 9/2021 | Robert | G05D 1/46 |
| 2021/0325544 | A1 * | 10/2021 | Bageshwar | G01S 19/52 |
| 2022/0107184 | A1 * | 4/2022 | Omr | G06T 7/277 |
| 2022/0155800 | A1 * | 5/2022 | Zhang | G01C 21/1654 |
| 2023/0001940 | A1 * | 1/2023 | Doerr | B60W 30/18109 |
| 2023/0400585 | A1 * | 12/2023 | Zhou | G06T 7/50 |
| 2024/0159538 | A1 * | 5/2024 | Barrau | G01C 21/165 |
| 2024/0159539 | A1 * | 5/2024 | Barrau | G01C 21/185 |
| 2024/0175890 | A1 * | 5/2024 | Abboud | G01N 29/46 |
| 2024/0263947 | A1 * | 8/2024 | Barrau | G01C 21/165 |
| 2024/0312061 | A1 * | 9/2024 | Wang | G06T 7/292 |

OTHER PUBLICATIONS

Abbott, Eric, and David Powell. "Land-vehicle navigation using GPS." Proceedings of the IEEE 87.1 (1999): 145-162. (Year: 1999).*

Emter, Thomas, and Janko Petereit. "Stochastic cloning and smoothing for fusion of multiple relative and absolute measurements for localization and mapping." 2018 15th International Conference on Control, Automation, Robotics and Vision (ICARCV). IEEE, 2018. (Year: 2018).*

CN-116772903-A machine translation (Year: 2023).*

CN-121099198-A machine translation (Year: 2025).*

Emter et al., "Stochastic Cloning and Smoothing for Fusion of Multiple Relative and Absolute Measurements for Localization and Mapping", 2018 15th International Conference on Control, Automation, Robotics and Vision (ICARCV), Singapore, Nov. 18-21, 2018, pp. 1508-1513.

French Search Report for French Application No. 2001069, dated Sep. 22, 2020.

International Search Report for International Application No. PCT/FR2021/050199, dated May 20, 2021.

Mourikis et al., "SC-KF Mobile Robot Localization: A Stochastic Cloning Kalman Filter for Processing Relative-State Measurements", IEEE Transactions On Robotics, vol. 23, No. 4, Aug. 2007, pp. 717-730.

* cited by examiner

FIG. 2

$$\delta X_n = \underset{\delta X}{\operatorname{argmin}} \sum_k \|A_k \delta X - b_k\|^2_{\Sigma_k}$$

E21

$$P(V^i | Y_0, \dots, Y_i) \sim \mathcal{N}(x^i, P^i)$$

E20

E22

$$P(V^i | Y_{i+1}, \dots, Y_T) \sim \mathcal{N}(J_i^{-1} y^i, J_i^{-1})$$

E23

$$\delta X^{*i}_n = \hat{V}^i_i = \left[ \left(Id + P^i J^i\right)^{-1} \left(x^i + P^i y^i\right) \right]_i$$

NAVIGATION ASSISTANCE METHOD FOR A MOBILE CARRIER

FIELD OF THE INVENTION

This invention relates to the field of tracking of the location of a navigation unit.

This invention more specifically relates to a method of navigation assistance for a mobile cagier, and an inertial navigation unit implementing said method.

PRIOR ART

In the field of estimation of the trajectory of an inertial unit based on its measurements and on external measurements coming from different sensors (GPS, video camera, LiDar, odometer, etc.), a Kalman filter is a well-known tool for tracking the navigation of a carrier such as a ship, an aircraft or a land vehicle, i.e. its position, speed, acceleration etc.

The Kalman filter estimates a navigation state of the carrier over successive iterations via matrix-based, and therefore linear, equations, by means of noisy measurements supplied by navigation sensors.

The unit is then considered as a dynamic system governed by linear equations, which constitutes a restrictive limitation.

To extend the Kalman filter to dynamic systems regulated by non-linear equations, provision has been made for a method denoted by the expression "Extended Kalman Filter" (EKF). This development makes provision for an additional step consisting in linearizing, at each new iteration of the filter, the equations governing the non-linear system at a point of the vector space, this point being typically a state estimated over a preceding iteration. The matrices resulting from this linearization can thus be used to compute a new state estimated using the conventional Kalman filter method.

Known extended Kalman filters do however have the drawback of not working correctly if the linearization point is too far from the actual navigation state of the carrier. However, in some navigation tracking situations, no accurate estimation of the navigation state of the unit is available at the start of the filter, so that the implementation of successive iterations of the extended Kalman filter does not make it possible to converge on an accurate estimate of the state.

A method of the prior art is also known called "smoothing" which consists in computing the trajectory leading to measurements as close as possible to the observations, by weighting the importance granted to each measurement by the accuracy of the sensor which produced it.

By comparison with the Kalman filter which processes the measurements sequentially and uses each of them a single time, smoothing makes it possible to "go back" to correct computations in the light of the latest available observations. This advantage makes this approach important for the use of certain types of sensor such as video cameras, for example.

However, a major shortcoming of smoothing was identified regarding its potential use in high-accuracy navigation units. Specifically, the performances achieved sharply deteriorate when 64-bit computers are replaced by conventional computers or by the 32-bit or even 16-bit electronic control units generally used by integrated systems. This phenomenon of deterioration, due to the accumulation of inaccuracies in numerical computations, is very dangerous since it can lead to the validation of an algorithm in the prototyping phase which will in fact never be able to be implemented on an end product, The cause of the problem has been identified as being the use of very badly-conditioned inverse matrices (a problem known to lead to considerable numerical errors).

There is therefore a need to improve the techniques of the prior art,

PRESENTATION OF THE INVENTION

An aim of the invention is to estimate the trajectory of an inertial unit based on its measurements and on external measurements coming from different sensors.

Another aim of the invention is to make provision for a method which is more appropriate to an execution on high-accuracy inertial navigation units than the solutions of the prior art described above.

Provision is hence made for a method of navigation assistance for a mobile carrier including an inertial navigation unit including at least one inertial sensor, wherein, over a determined observation window, the following steps are implemented by an estimation unit of the inertial navigation unit:

parameterization of a non-linear system estimating a navigation state of the mobile carrier at an iteration n as a function of a kinetic model and/or of measurements acquired by at least one inertial sensor;

linearization of said system around the estimated navigation state;

estimation by a Kalman filter and stochastic cloning of a first correction of the estimated navigation state of the carrier;

estimation of a second correction by an information filter running backwards and also using stochastic cloning;

determination of a third correction by fusion of the first and second corrections; and correction of the estimated navigation state at iteration n+1 as a function of the third correction.

Advantageously, the method also includes one or more of the following features:

the step of estimation by the Kalman filter and stochastic cloning of the first correction is done over successive timesteps of computation of a correction of the estimated navigation state of the carrier, one timestep of the filter comprising steps of:

propagation of a preceding navigation state of the carrier into a propagated state as a function of a kinetic model and/or of measurements acquired by at least one inertial sensor, updating of the propagated state as a function of direct or relative measurements acquired by at least one additional sensor;

the step of estimation of the second correction by the information filter and stochastic cloning of the first correction is done over successive timesteps, and includes for one timestep of the information filter the steps of:

back-propagating of a correction of the posterior navigation state of the carrier into a correction of the propagated state as a function of a kinetic model and/or of measurements acquired by at least one inertial sensor, updating the correction of the propagated state as a function of direct or relative measurements acquired by at least one additional sensor.

in the step of estimation by the Kalman filter and stochastic cloning of the first correction, the correction of the navigation state propagated by the Kalman filter includes a clone of a correction of the navigation state earlier than the correction of the propagated navigation state, as long as said correction of the earlier navigation state is involved in a relative measurement of a state correction later than the correction of the propagated navigation state, and wherein in the step of estimation of the second correction by the information filter running backwards and stochastic cloning, the correction of the navigation state back-propagated by the information filter running backwards includes a done of a navigation state correction later than the correction of the back-propagated navigation state, as long as said correction of the later navigation state is involved in a relative measurement of a state correction earlier than the correction of the propagated navigation state.

The navigation state to be estimated is formulated in the following form $$X^* = \underset{X}{\mathrm{argmin}} \sum_k \|\psi_k(X)\|^2_{P_k},$$

where the $\psi_k$ are cost functions associated with the measurements of each sensor, $P_k$ is the covariance matrix associated with the k-th measurement, i.e, the uncertainty that is associated therewith, the notation $$\|e\|^2_{P_k} = e^T P_k^{-1} e$$

represents a Euclidian norm weighted by the inverse of the matrix $P_k$.

the non-linear system estimating a navigation state X of the mobile carrier is linearized about an estimated navigation state, to define a correction $\delta X_n^*$ in the estimated state of the following form:

$$\delta X_n^* = \underset{\delta X}{\mathrm{argmin}} \sum_k \|A_k \delta X - b_k\|^2_{P_k}.$$

the propagation step implements an augmented transition matrix in the form $$\begin{bmatrix} Id & \\ & F \end{bmatrix},$$

with F corresponding to a transition matrix which relates a preceding state correction to a current state correction k, and Id an identity matrix of dimensions equal to the number of clones of the past states.

the updating step implements an augmented observation matrix in the form $\tilde{H}=[\ldots H_i \ldots H_j \ldots]$, the blocks being of indices 1 and j, the rest being composed of zeros.

The proposed method makes it possible to reformulate the computing the "Maximum A Posteriori", MAP, used in smoothing so as to make the inverse of these matrices appear only implicitly to thus avoid undergoing the effects of the numerical approximations.

The proposed method also makes it possible to extend the Kalman smoother to problems combining inertial measurements and measurements of any other kind, direct and/or relative, of the states. The method is based on the joint use of the smoother and the so-called "stochastic cloning" method. This makes it possible to perform, inter alia, inertia-vision and inertia-LiDar fusions based on numerically stable Maxima A Posteriori, even while using high-accuracy navigation units, and in integrated architectures with reduced computational ability.

According to a second aspect, the invention moreover makes provision for an estimation unit of a mobile carrier configured to implement the preceding method of navigation assistance for a mobile carrier.

According to a third aspect, the invention makes provision for an inertial navigation unit of a mobile carrier comprising an interface for receiving inertial measurements acquired by at least one inertial sensor, an interface for receiving additional measurements acquired by at least one additional sensor, an estimation unit according to the second aspect for estimating a navigation state of the unit on the basis of measurements acquired by the interface for receiving inertial measurements and the interface for receiving additional measurements.

Provision is also made for a computer program product comprising program code instructions for executing the steps of the preceding method, when this program is executed by an estimation unit, according to the second aspect, of a trajectory of a mobile carrier.

DESCRIPTION OF THE FIGURES

Other features, aims and advantages of the invention will become apparent from the following description, which is purely illustrative and non-limiting, and which must be read with reference to the appended drawings wherein:

FIGS. 2 and 3 illustrate the steps of a method for tracking the location of a navigation unit of a mobile carrier, according to an embodiment of the invention.

DETAILED DESCRIPTION OF THE INVENTION

The term "stochastic cloning" should be understood to mean an increase in the state of a system by duplication of the past states involved in a future observation.

The term "correction of a navigation state" should be understood to mean the estimate of the difference between the estimated state and the actual state of the system.

The term "fusion of two corrections" should be understood to mean the computation of a consolidated correction resulting from two previously-obtained corrections, usually by the application of a weighted mean. The weights are preferably obtained by the information matrix coming from the information filter and the inverse of the covariance matrix coming from the Kalman filter.

The term "information filter running backwards" should be understood to mean a recursive computation of the vector and of the information matrix of a Gaussian law representing the information from the future states, carried out from the last to the first timestep of the window.

The term "navigation state" should be understood to mean a set of variables representative of at least the orientation and the position or the orientation and the speed of a carrier, at a determined time or during a series of times.

In the remainder of the text, the covariances of the measurements are written P with a lower index, and the covariances returned by the Kalman filter are written P with an upper index.

Figure 1:
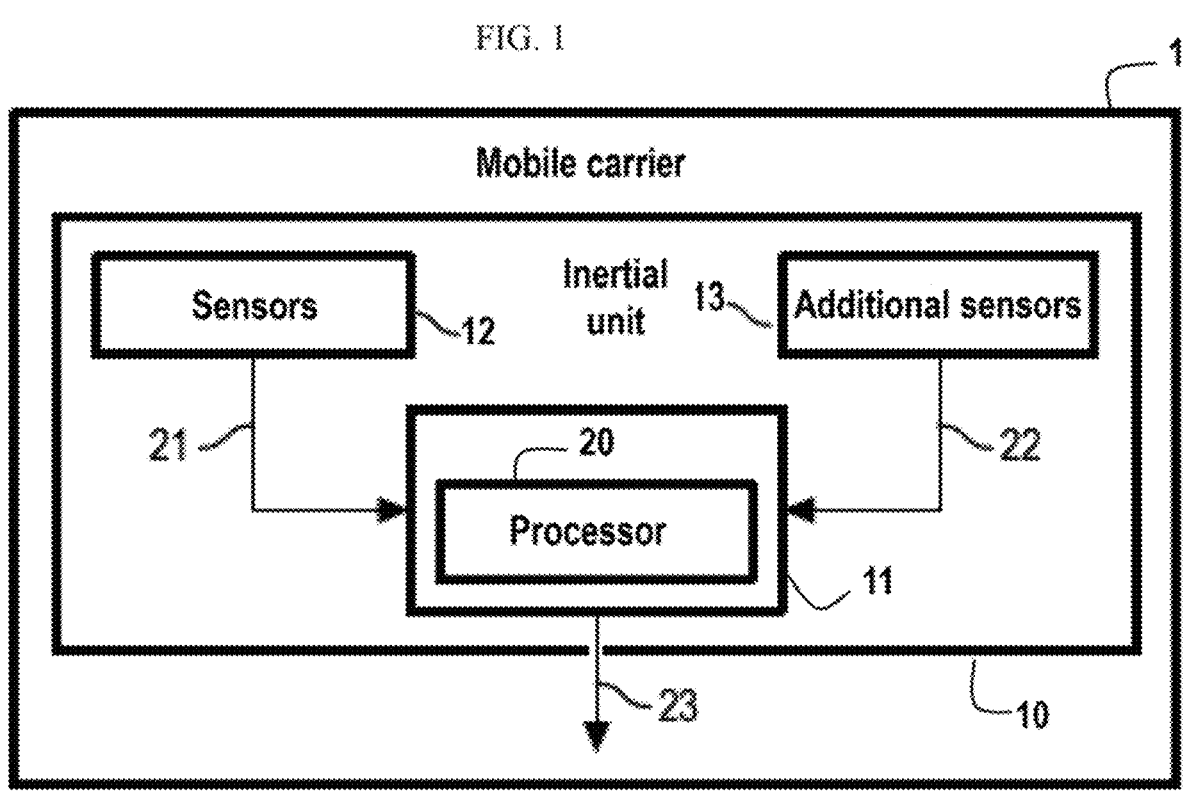
FIG. 1 shows a navigation unit for a mobile carrier according to an embodiment of the invention.

With reference to FIG. 1, an inertial unit 10 is integrated on a mobile carrier 1, such as a land vehicle, a helicopter, an airplane etc. The inertial unit 10 includes several parts: inertial sensors 12, additional sensors 13, and an estimation unit 11 for implementing estimation computations. These parts can be physically separate from one another.

The inertial sensors 12 are typically accelerometers and/or gyroscopes respectively measuring specific forces and rotation speeds that the carrier undergoes with respect to an inertial reference frame. The specific force is equivalent to the original non-gravitational acceleration. When these sensors are fixed with respect to the carrier, the unit is said to be of "strap down" type.

The additional sensors 13 are variable according to the type of carrier, its dynamic range, and the intended application. Inertial units typically use a GNSS receiver (GPS for example). For a land vehicle, it can also be one or more odometers. For a boat, this can be a "loch", giving the speed of the boat with respect to that of the water or seabed. Video cameras or radar, for example of LiDar type, form another example of additional sensors 13.

The output data of the estimation unit 11 are a state representative of the navigation of the carrier, which will be referred to in the remainder of the text as the navigation state x and where applicable internal states of the inertial unit 10.

Three different types of measurements can be discerned, according to the type of sensor from which they come. The following can thus be discerned:

- inertial measurements relating two consecutive states $x^i$ and $x^{i+1}$;
- direct measurements involving only one of the $x^i$ at a time, such as GPS measurements; and
- relative measurements, i.e. they relate at least two states $x^i$ and $x^j$ which may not be consecutive. This is for example the case of the measurements obtained with video cameras or LiDar.

This navigation state may comprise at least one navigation variable of the carrier (position, speed, acceleration, orientation etc.) The navigation state can under any circumstances be represented in the form of a vector, each component of which is a navigation variable of the carrier.

The estimation unit 11 particularly comprises an algorithm configured to fuse the information given by the additional sensors 13 and the inertial sensors 12 such as to supply an optimal estimate of the navigation information. The fusion is done according to a continuous or discrete dynamic system serving as a model to predict the state at each time based on the state at the preceding time, using a non-linear propagation function f, and the way of observing it using an observation function h can also be non-linear. Such a system is non-linear.

The estimated quantities will subsequently be written with circumflex accents ($\hat{x}$) and the actual quantities without circumflex accents (x).

The estimation unit 11 includes a primary interface 21 for receiving measurements acquired by the inertial sensors 12, a secondary interface 22 for receiving measurements acquired by the additional sensors 13, and at least one processor 20 onfigured to implement the method described below.

The smoothing is an algorithm able to be encoded in the form of a computer program executable by the processor 20.

The estimation unit 11 further comprises an output 23 for delivering output data computed by the processor 20.

Figure 2:
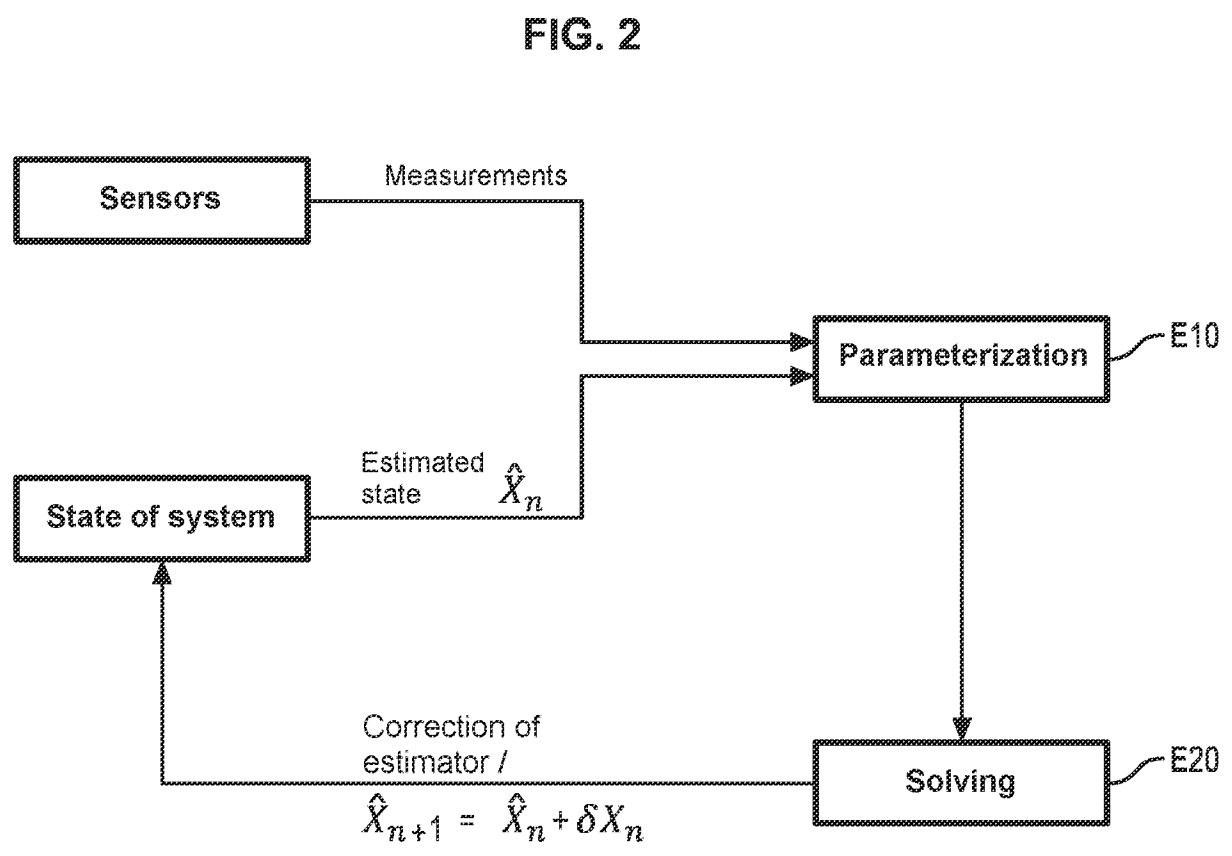
Figure 3:
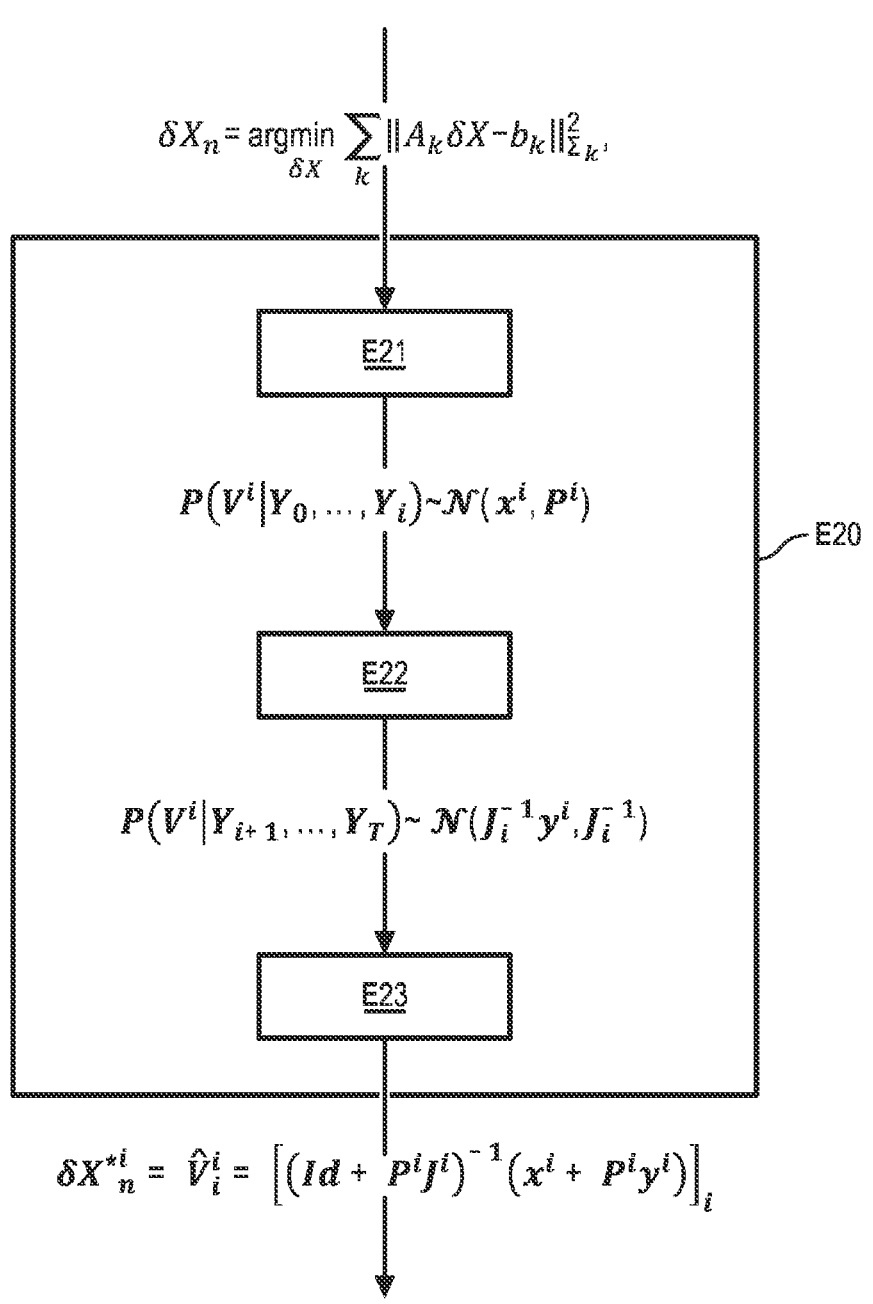

With reference to FIGS. 2 and 3, certain steps are illustrated of a method of navigation assistance for a mobile carrier including an inertial navigation unit, implemented by the estimation unit 11 according to an embodiment of the invention, As part of this method, the trajectory followed by the carrier is estimated, the navigation state of said carrier being the last state of said trajectory. Based on a trajectory $\hat{X}_n$, estimated in any way whatsoever, a method is used to determine a correction to be applied to said trajectory to obtain a corrected trajectory that can take into account the information items given, at any time during the navigation, by the additional sensors 13 and the inertial sensors 12 such as to supply an optimal estimate of the navigation information.

Since the trajectory $\hat{X}_n$ is estimated by a non-linear problem, in a so-called parameterization step E10, it is implemented in the way in which a non-linear system is configured to describe a change of a navigation state of the mobile carrier 1. Consequently, the system after linearization forms a linear least squares problem to be solved to determine a correction $\delta x_n^*$ of the estimated trajectory $\hat{X}_n$.

The trajectory associated with the MAP is defined by a non-linear optimization problem of the form $$X^* = \underset{X}{\operatorname{argmin}} \sum_k \|\psi_k(X)\|_{P_k}^2$$

wherein:

the $\psi_k$ are cost functions associated with the measurements of each sensor, $P_k$ is the covariance matrix associated with the kth measurement, i.e. the uncertainty that is associated therewith, the notation $$\|e\|_{P_k}^2 = e^T P_k^{-1} e$$

represents a Euclidian norm weighted by the inverse of the atrix $P_k$.

The estimated trajectory $\hat{X}_n$ can then be corrected over an iteration of the method. The method relies on an iterative solving of the non-linear optimization problem by successive linearizations of the problem. A search is thus made for a series of solutions of the form $$\hat{X}_{n+1} = \hat{X}_n + \delta X_n^*,$$

while seeking to minimize a linear system approximating the problem of optimization of the MAP, which leads to solving a succession of linear least squares problems of the form:

$$\delta X_n^* = \underset{\delta X}{\mathrm{argmin}} \sum_k \|A_k \delta X - b_k\|_{P_k}^2$$

where the matrices $A_k$ and the vectors $b_k$ depend on the measurements, on $\hat{X}_n$, and on the chosen parameterization. The method considering a trajectory, or part of it, composed of several successive states, $\delta X_n$ is in fact composed of several blocks each representing one of these states: $\delta X_n^1, \ldots, \delta X_n^P$.

The problem encountered stems from the fact that the standard methods of solving these linear problems require the explicit computation of $P_k^{-1}$, which can lead to severe numerical problems in the case of high-accuracy inertial units, particularly on integrated architectures operating with reduced computation means, with 32-bit or even 16-bit cards.

An alternative that can also be applied in the proposed method consists in considering, not $P_k$, but its square root, a matrix $S_k$ such that $P_k = S_k S_k^T$, which one also avoids inverting.

Thus the non-linear system is linearized about a navigation state (step E20). The navigation state at the iteration n is composed of the sequence of states $\hat{X}_n$. It is considered that the system is initialized to the first iteration by a first a priori state. This state can be any state whatsoever, Once the problem has been linearized (step E20), the steps E21, E22, E30 of solving of this system are performed. Provision is made for a solving algorithm, which finds the exact solution of the linear least squares problem, but makes it possible to avoid the numerical stability problems that could appear with a unit of too high accuracy.

To do this, use is made of the fact that the least squares problem can be solved without numerical instability by a method known as a Kalman smoother completed with a so-called "stochastic cloning" method, making it possible to vary the number of states of the system so that it is written in a form compatible with the Kalman smoother.

This smoother, which applies to linear systems, is constructed on the output of a Kalman filter, i.e. it is used to correct the estimates resulting from the Kalman filter by including the information contained in the observations coming from the future. Thus, to apply this smoother, one must first scan the data in the "direct" sense, i.e. from the time i=1 to the time i=T (where T is the duration of the observation window), by applying a Kalman filter to them. The information filter, which operates backwards, i.e. from the time k=T to the time k=1, can then be applied. Consequently, after the smoother, the estimate of the state at the time i does not only take into account the past observations Y1, . . . , Yi but all the observations contained in the observation window Y1, . . . , YT.

In a known manner, a Kalman filter KF is a recursive estimator described by a linear system. Here, these linearized states are the corrections to be applied to the navigation states of the trajectory.

The filter is initialized with an initial state, which will serve as input for a first timestep of the filter. Each following timestep of the filter takes as input a state estimated by a preceding timestep of the filter, and supplies a new estimate of the linearized state (or correction) of the carrier.

A timestep of the Kalman filter conventionally comprises two steps: a propagation, and an update.

The propagation step determines a propagated linearized state of the carrier on the basis of the preceding linearized state (or the initial linearized state for the first iteration), and this by means of the linearized propagation function.

The Kalman filter makes it possible to perform the approximation of the mean and variance of the conditional probability distribution of a linearized state knowing all the past observations, i.e. up to this time.

There exists a very specific set of circumstances in which $\delta X^*_n$ can be obtained without having to compute the inverses of the matrices $P_k$ associated with measurements of an inertial unit: the one where the measures are separated into two categories:

inertial measurements, coming from the inertial sensors 12, which relate $\delta X_n^i$ and $\delta X_n^{i+1}$, the covariances of which are denoted Q, and direct measurements, coming from the additional sensors 13, involving only one of the $x^i$ at a time, such as GPS measurements.

Specifically, in this case, the Kalman smoother can be used to solve the problem, and one of its recent formulations makes it possible to avoid having to invert the problematic matrices.

This uses a second estimation by the Kalman filter, this time applied in the backward direction of the observations in a known form moreover known as "information filter", supplying a second correction. This is then fused with the result of the first Kalman filter.

The Kalman smoother makes it possible to obtain the desired means $x^1, \ldots, x^P$, However, the Kalman smoother does not apply as such in other cases, particularly when the measurements other than inertial ones are relative measurements, i.e. they relate at least two states $\delta X_n^i$ and $\delta X_n^j$. This is the case for example for measurements obtained video cameras or LiDars, For all additional sensors 13, the covariances of the associated measurements are denoted R.

To be able to extend the Kalman smoother to problems combining inertial measurements and measurements of any kind, direct and/or relative, of the states, the method is based on the joint use of the smoother and the so-called "stochastic cloning" method, detailed hereinafter. This makes it possible to carry out, inter alia, inertia-vision and inertia-LiDar fusions based on numerically stable Maximum A Posteriori, even using high-accuracy navigation units, and in integrated architectures with reduced computational ability.

Figure 4A:
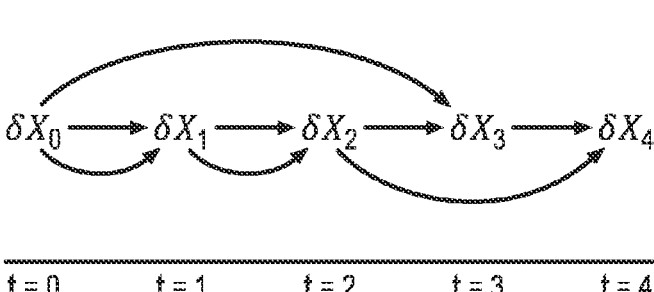
FIGS. 4A, 4B, 4C show a time-domain diagram illustrating arrival times of acquired measurements and processing times taken by a navigation unit according to an embodiment of the invention.

With reference to FIG. 4A, there is illustrated an example of a trajectory to be estimated by smoothing over a determined time period, The straight arrows between two successive states indicate inertial measurements and the curved arrows denote relative measurements between two states which may not be successive.

Figure 4B:
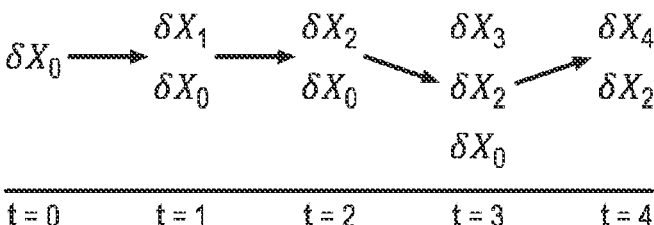

The use of stochastic cloning is illustrated in FIG. 4B. Thus, the state evolves by retrieving clones of the past states which are involved in later measurements, for example $\delta X_0$ which will have a direct impact on $\delta X_3$. The use of stochastic cloning is represented by alternative states $V^1, \ldots, V^P$ the size of which varies over time, since they will contain in memory clones of past states, as long as these are involved in a measurement with a later state. The alternative state $V^i$ is therefore formed of $\delta X^i$ and clones of earlier states $\delta X^{j1}, \ldots, \delta X^{jm}$.

Figure 4C:
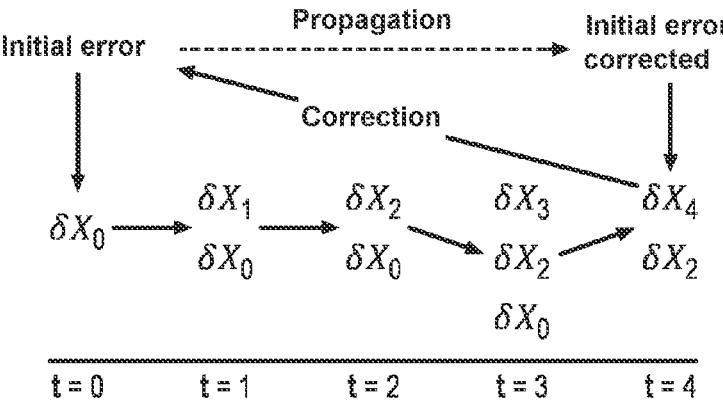

FIG. 4C illustrates the advantages of the joint use of the smoother and the so-called "stochastic cloning" method with a high linearization error. Thus, the propagation of the information is relatively stable, and the correction of the initial error brought about by the smoothing is therefore properly taken into account, to obtain an estimate of better quality.

Figure 4D:
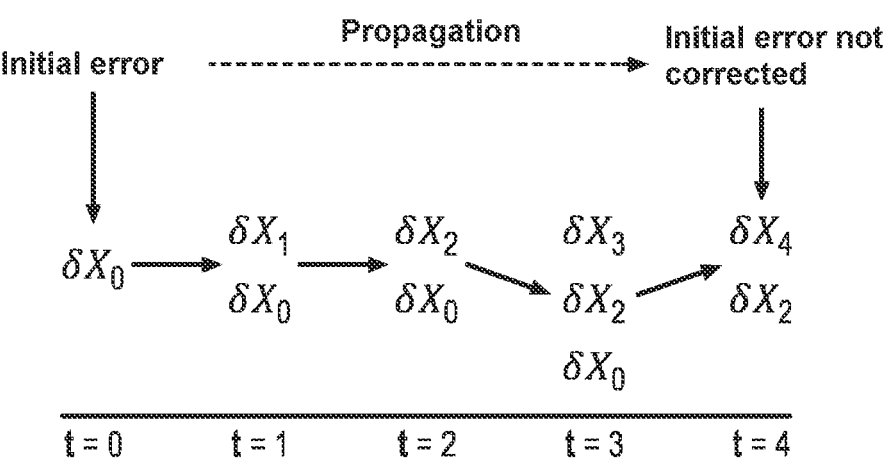
FIGS. 4D and 4E show a time-domain diagram illustrating arrival times of acquired measurements and processing times taken by a navigation unit according to different embodiments of the invention.
Figure 4E:
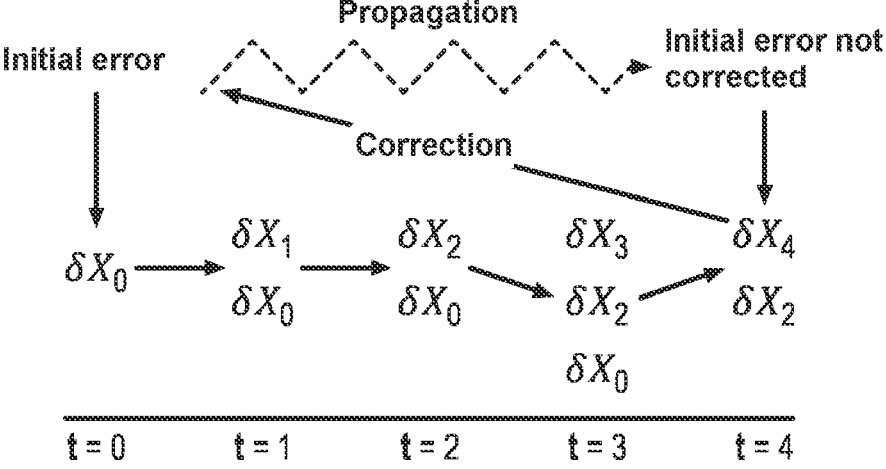

By comparison, FIG. 4D illustrates the limits of the application of the Kalman filter with stochastic cloning. Thus, a high linearization error, as may exist in inertia-vision fusion, is propagated and never corrected afterwards, which can lead to an estimate of lower quality, or even one that is incoherent, FIG. 4E illustrates the theoretical advantages and the practical limits of conventional smoothing with respect to the method illustrated in the example of FIGS. 3 and 4. Theoretically, the initial linearization error must be corrected owing to later measurements. However, in actual fact the numerical errors of the conventional implementations take over and severely degrade the estimate.

The joint use of the smoother and the so-called "stochastic cloning" method can be implemented by the following algorithm.

In particular, one is seeking to compute at each iteration a first correction (step E21) and a second correction (step E22) of the navigation state in the iteration under consideration.

In a step E21, to apply this smoother, the data are scanned in the "direct" direction, i.e. from the time i=0 to the time i=T (where T is the duration of the observation window), by applying a Kalman filter to them to determine a vector $x^i$ and a matrix $P^i$, representative of the information up to the time i, i.e.

$$P(V^i \mid Y_0, \ldots, Y_i) \sim \mathcal{N}(x^i, P^i)$$

In particular, the correction associated with the state i will be given by the last block of $V^i$, therefore its mean by the last block of $x^i$, and its covariance by the block on the bottom right of $P^i$.

$$P(\delta X_n^i \mid Y_0, \ldots, Y_i) \sim \mathcal{N}(x_i^i, P_{ii}^i)$$

[1] Initialization $$x^0 = \delta X_n^0, \ P^0 = P_0$$

[2] F each iteration i
[3] If $\delta X_n^{i-1}$ is involved in a later measurement, cloning of $\delta X_n^{i-1}$ in the mean $x^{i-1}$ of the alternative state. The covariance $P^{i-1}$ is extended by duplicating the last row, then the last column
[4] Propagation of the extended state:

$$x^i \leftarrow \tilde{F} x^{i-1} \text{ with } \tilde{F} = \begin{bmatrix} Id \\ & F \end{bmatrix}$$

the identity matrix being of dimensions equal to the number of clones stored in the alternative state. The covariance is propagated conventionally.
[5] If there is a measurement between i and j with j<i
[6] Update according to the known Kalman gain equations with $$\tilde{H} = [\ldots \ H_i \ \ldots \ H_j \ \ldots \ ]$$

the blocks being of indices i and j

[7] If $\delta X_n^j$ is not involved in a later measurement, deletion of $\delta X_n^j$ in the alternative state: deletion of the block, rows and columns associated in $x^i$ and $P^i$.

In a step E22, the smoother is applied to recursively compute the distribution a posteriori $$P(V^i \mid Y_{i+1}, \ldots, Y_T),$$

in the form representative of the information starting from the time i, i.e. via a vector $y^i$ and an information matrix $J^i$ encoding a normal distribution $$\mathcal{N}(J_i^{-1} y^i, J_i^{-1})$$

The matrix $J^i$ therefore corresponds to the inverse of the covariance matrix associated with this distribution.
[1] initialization $y^0=0$, $j^0=0$
[2] for each iteration i ranging from n to 0
[3] If $\delta X_n^i$ is involved in a preceding measurement, extend $y^i$ with as many zeros as the dimension of $\delta X_n^i$, and add to j as many rows of zeros, then as many columns of zeros.
[4] If there is a measurement $Y_{ij}$ between $\delta X_n^{i \text{ and }} \delta X_n^j$ with j<i
[5] Update in the form of information with $$\tilde{H} = [\ldots \ H_i \ \ldots \ H_j \ \ldots \ ]$$

the blocks being of indices i and j:

$$y^i \leftarrow y^i + \tilde{H}^T R^{-1} Y_{ij}$$

$$\text{and } J^i \leftarrow J^i + \tilde{H}^T R^{-1} \tilde{H}$$

[6] If $\delta X_n^j$ is not involved in an earlier measurement, fusion of $\delta X_n^j$ in the extended information item:

$$y_i^i \leftarrow y_i^i + y_j^i \text{ and } J_{ii}^i \leftarrow +J_{ij}^i + J_{ji}^i + J_{jj}^i,$$

where $y_k^i$ denotes the part of y corresponding to the clone $\delta X_n^k$ and $J_{kl}^i$ corresponds to the information block associated with $\delta X_n^k$ and $\delta X_n^l$, then deletion of the blocks associated with $\delta X_n^j$,

[7] Back-propagation of the extended information item:

$$y^{i-1} \leftarrow \tilde{F}^T (Id + J^i Q)^{-1} y^i \text{ with } F = \begin{bmatrix} Id \\ & F \end{bmatrix}$$

the identity matrix being of dimensions equal to the number of clones stored in he alternative state, and $$J^{i-1} \leftarrow \tilde{F}^T (Id + J^i Q)^{-1} J^i \tilde{F}^T$$

In a step E30, the "direct" and "backward" estimates are then fused. It is thus a question of fusing the first and second corrections obtained in steps E21 and E22 respectively.

Thus for each iteration i, one may now proceed to the following computation of the final correction of $$\hat{V}_n^i = \left(Id + P^i J^i\right)^{-1}\left(x^i + P^i y^i\right) \qquad 5$$

Then, for each i, the correction of the navigation state $\delta X_n^{i*}$ is obtained as the last block of the extended state $\hat{V}_n^i$.

Next, once the correction is determined, the objection (step E40) of the navigation state is then performed in the following form:

$$\hat{X}_{n+1} = \hat{X}_n + \delta X_n^*. \qquad 15$$

The proposed method therefore makes it possible to extend the Kalman smoother to problems combining inertial measurements and measurements of any kind, direct and/or relative, of the states. The method is based on the joint use of the smoother and of the so-called "stochastic cloning" method detailed hereinafter. This makes it possible to carry out, inter alia, inertia-vision and inertia-LiDar fusions based on numerically stable Maxima A Posteriori, even while using high-accuracy navigation units, and in integrated architectures with reduced computational ability.

The invention claimed is:

1. A computer implemented method of navigation assistance for a mobile carrier including an inertial navigation unit including at least one inertial sensor, wherein, the following steps are implemented by an estimation unit of the inertial navigation unit, over a determined observation window:

acquiring a kinetic model and/or of measurements by at least one inertial sensor (12), a navigation state comprises at least position, speed, acceleration, orientation of the mobile carrier;

parameterizing a non-linear system configured to estimate a navigation state of the mobile carrier over a given time interval at an iteration n as a function of the kinetic model and/or of measurements acquired, the non-linear system estimates a trajectory of the mobile carrier;

linearizing said non-linear system for expressing the navigation state at the iteration n as a function of the state at an iteration n−1 and of a correction to this navigation state, said system being initialized by a first a priori state;

determining a first correction of a navigation state at the iteration n, by combining a Kalman filtering of the non-linear system to a stochastic cloning of the non-linear system,;

wherein the stochastic cloning consists in duplicating the past states of the non-linear system to future states of the non-linear system;

estimating a second correction of the navigation state at the iteration n by an iterative information filter running backwards and stochastic cloning;

determining a third correction by fusion of the first and second corrections; and outputting the third correction which is used to control the correcting of the navigation state at the iteration n as a function of the third correction, said corrected state being used at an iteration n+1 as being the navigation state for this iteration n+1, the corrected navigation state including the correction of at least the orientation and the position or the orientation and the speed of the mobile carrier, and thus controlling the correction of the trajectory of the mobile carrier.

2. The computer implemented method as claimed claim 1, wherein the step of determining the first correction is done over successive timesteps, one timestep comprising steps of:

propagation of a preceding navigation state of the carrier into a propagated state as a function of a kinetic model and/or of measurements acquired by the at least one inertial sensor, updating of the propagated state as a function of measurements acquired by the at least one additional sensor, the step of estimating the second correction is done over successive timesteps, and includes, for a timestep the steps of:

back-propagating a correction of a posterior navigation state of the carrier into a correction of the back-propagated state as a function of a kinetic model and/or of measurements acquired by the at least one inertial sensor, updating of the correction of a back-propagated state as a function of measurements acquired by the at least one additional sensor.

3. The computer implemented method as claimed in claim 2, wherein, for estimating the first correction, the first correction of the navigation state propagated by the Kalman filter includes a clone of a correction of the navigation state earlier than the correction of the propagated navigation state, if correction of an earlier navigation state is involved in a relative measurement of a state correction later than a correction of the propagated navigation state; and wherein for estimating the second correction, the second correction of the navigation state back-propagated by the information filter running backwards includes a clone of a navigation state correction later than a correction of the back-propagated navigation state, if correction of a later navigation state is involved in a relative measurement of a state correction earlier than a correction of the propagated navigation state.

4. The computer implemented method as claimed in claim 1, wherein the non-linear system configured to estimate the navigation state is expressed as follows:

$$X^* = \underset{X}{\operatorname{argmin}} \sum_k \|\psi_k(X)\|_{P_k}^2,$$

where $\psi_k$ are cost functions associated with the measurements of each inertial sensor, $P_k$ the covariance matrix associated with the k-th measurement, that is an uncertainty that is associated therewith, the notation $$\|e\|_{P_k}^2 = e^T P_k^{-1} e$$

represents a Euclidian norm, e, weighted by an inverse of the matrix $P_k$.

5. An inertial navigation unit of a mobile carrier comprising:

an interface for receiving inertial measurements acquired by at least one inertial sensor, an interface for receiving additional measurements acquired by at least one additional sensor, an estimation unit as claimed in claim 1 for estimating the navigation state of the unit on the basis of measurements acquired by the interface for receiving inertial measurements and the interface for receiving additional measurements.

6. A non-transitory computer program product comprising code instructions which, when executed by a processor, cause the processor to perform the method according to claim 1.

\* \* \* \* \*